United States Patent Office 3,829,286
Patented Aug. 13, 1974

3,829,286
SUBLIMATION TRANSFER DYEING WITH 4,8-DI-HYDROXY-1-ARYLAMINO-ANTHRAQUINONES
Masao Anzai, Funabashi, and Masayuki Miyatake, Tokyo, Japan, assignors to Toppan Printing Co. Ltd., and Toyo Ink Manufacturing Co., Ltd., both of Tokyo, Japan
No Drawing. Filed Feb. 16, 1973, Ser. No. 333,033
Claims priority, application Japan, Feb. 23, 1972, 47/18,105
Int. Cl. D06p 1/20
U.S. Cl. 8—2.5     14 Claims

ABSTRACT OF THE DISCLOSURE

A sublimation transfer dyeing method which is characterized by the use of novel and improved compounds of the general formula:

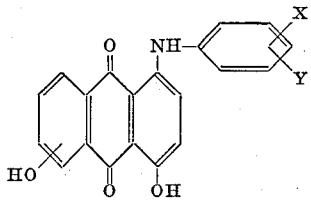

in which X represents a methyl group or ethyl group at ortho or meta position with regard to the imino group, and Y represents a hydrogen atom, methyl group, methoxy group, fluorine atom or chlorine atom.

---

This invention relates to a novel sublimation transfer dyeing method in which the dyeing can be carried out substantially without the presence of the dyeing medium, in other words, the method of the invention utilizes the phenomena of sublimation, vaporization, transferring and fusing of dyestuff. More particularly, in the method of the present invention, a printing ink is prepared by mixing a sublimable dyestuff as the colouring agent which is sublimated by heating; a binder having a softening point of higher than the melting point or sublimation point of said sublimable dyestuff and preferably being hardly coloured by said dyestuff; a solvent such as water or an organic solvent, and, if necessary, other additives, with using a mixer such as a ball mill. Then a transfer paper or decalcomania is formed by printing desired patterns or designs on a base sheet through appropriate printing method with using said printing ink. The printed surface of thus obtained transfer paper is then closely contacted on the surface of a material to be dyed, and the sublimable dyestuff on the transfer paper is transferred to the surface and interior of said material by heating, thereby the desired pattern can be formed on said surface and in the interior. While, no after-treatment is necessary for this procedure. The above is the general feature of the present invention, however, the following modifications should be included within the scope of the present invention. That is, as the methods in which the materials is modified, there are a method to treat the material to be dyed with transitional metals and forming complexes with the sublimable dyestuff, and a method to use aluminum being treated by anodic oxidation as the material to be dyed. Further, as the method in which the transferring condition is modified, there is a transfer dyeing method to carry out the heat transferring operation at a pressure less than atmospheric pressure.

The present invention proposes novel and improved blue dyestuffs which are used in the above sublimation transfer dyeing method.

As the ordinarily known blue dyestuffs for the sublimation transfer dyeing method, there are for example, 1,4-bismethylaminoanthraquinone, 1-amino-4-anilinoanthraquinone, 1-methylamino-4-anilinoanthraquinone and 1-methylamino-4-β-hydroxyethylaminoanthraquinone.These dyestuffs are, however, not satisfactory in lightfastness, and especially, when they are used in light shadow colour or mixed colour dyeing, considerable discoloration and fading are caused, therefore they are not practically employed.

Besides the above, there are 1-amino-2-cyano-4-anilinoanthraquinone, 1-amino-2-cyano-4-cyclohexylaminoanthraquinone, halides of diamino anthrarufin or diamino chrysazin, and alkyl-1,4-diaminoanthraquinone-2-carboxylate. However, the temperature gradients of sublimation transferring velocities of the above-mentioned compounds are large. That is, the dyestuff which is large in the temperature gradient of sublimation transferring velocity means that, when it is sublimated both at a higher temperature and at a lower temperature, the difference of the amount of such sublimations between said higher temperature and said lower temperature is large. On the contrary, the dyestuff which is small in the temperature gradient of sublimation transferring velocity means that the difference of the amounts of the above-mentioned sublimations is small. Accordingly, when a dyestuff having a large temperature gradient of the sublimation transferring velocity is used for the sublimation transfer dyeing, a small unevenness of the temperature of heating apparatus causes uneven sublimation of the dyestuff, which will result in uneven colouring of the material to be dyed. Therefore, such dyestuff having large temperature gradient of sublimation transferring velocity is not suitable for the sublimation transfer dyeing method. As explained in the above, heretofore a satisfactory blue dyestuff suitable for the sublimation transfer dyeing have never been found yet.

As the result of eager and extensive studies, the inventors of the present application have found improved blue dyestuffs which are advantageously used for the sublimation transfer dyeing method, and said new dyestuffs are represented by the following general formula (I):

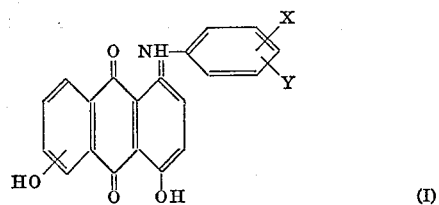
(I)

in which X is a methyl group or ethyl group which is substituted at the ortho or meta position with regard to the imino group, and Y is a hydrogen atom, methyl group, methoxy group, fluorine atom or chlorine atom.

Meanwhile, in U.S. Pat. No. 2,341,891, it is disclosed that 1,5-dihydroxy-4-arylaminoanthraquinones, more particularly, 1,5-dihydroxy-4-(3'-methylolanilino) anthraquinone, 1,5-dihydroxy - 4 - anilinoanthraquinone, 1,5-dihydroxy-4-(4' - methyl-3'-methylolanilino) anthraquinone, 1,5-dihydroxy-4-(p-toluidino) anthraquinone and 1,5-dihydroxy - 4 - (4'-β-hydroxyethoxyanilino) anthraquinone are useful as disperse dyes. They are, however, not suitable as the dyestuffs for the sublimation transfer dyeing method, because the velocities of dyeing are low.

It is unexpected fact that each dyestuff as represented by the above-mentioned general formula (I) in which the ortho position or meta position with regard to the imino group is substituted by methyl group or ethyl group, is small in the temperature gradient of the velocity of sublimation transfer dyeing, and the dyeing property thereof is excellent, as compared with the compound which is not substituted or is substituted at para position by a methy group or ethyl group.

According to the method of the present invention, clear and deep blue dying can be carried out, and even in the light shadow blue dyeing, the lightfastness of the colour is very excellent.

The dyestuffs which are represented by the formula (I) used in the method of the present invention can be obtained by ordinarily known chemical methods. For example, a leuco compound of 1,4,6-trihydroxy anthraquinone and substituted aniline being represented by the following general formula (II) are heated in an inert solvent, and in some case, further treated with a weak oxidizing agent. The above general formula (II) is:

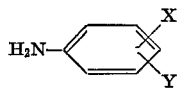

(II)

in which X and Y are the same substituent groups or atoms as those in the foregoing formula (I).

Or in another method, an anthraquinone derivative being represented by the following general formula (III) is condensed with said substituted aniline of the formula (II), where said general formula (III) is:

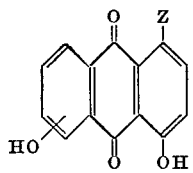

(III)

in which Z is a nitro group or halogen atom.

Now the method for sublimation transfer dyeing of the present invention will be explained in detail in the following.

The present invention proposes an improved method for the sublimation transfer dyeing by using, with or without other dyestuffs, the compound which is represented by the following general formula (I):

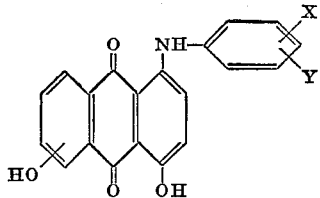

(I)

in which X is a methyl group or ethyl group which is substituted at the ortho or meta position with regard to the imino group, and Y is a hydrogen atom, methyl group, methoxy group, fluorine atom or chlorine atom.

The other dyestuffs which can be used together with the dyestuffs of the general formula (I) are, for example, anthraquinone dyes such as hydroxyanthraquinone and aminoanthraquinone, azo dyes, quinophthalone dyes, styryl dyes and nitro diaryl amine, which may be exemplified by the structural formulae as follows:

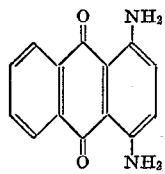

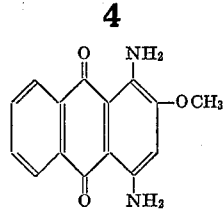

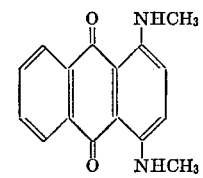

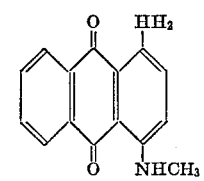

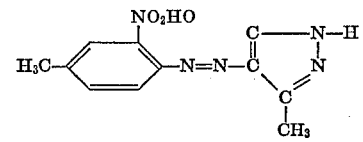

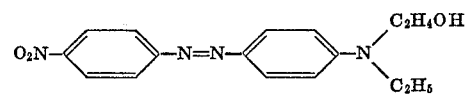

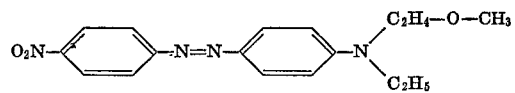

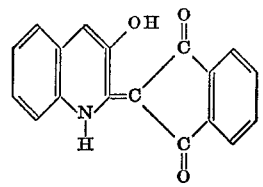

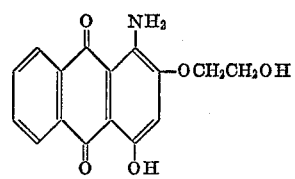

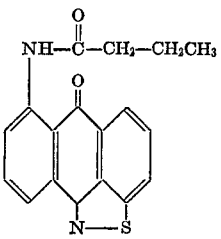

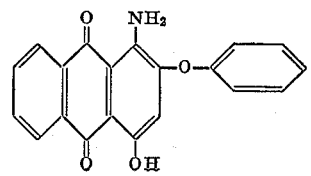

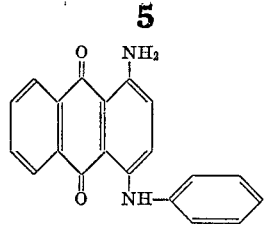

Besides the aboves, derivatives of 1,8-dihydroxy-4,5-diamino anthraquinone can be used.

While, it is advantageous that the dyestuffs which being used together with the dyestuffs of the general formula (I), have similar properties to those of the latter, especially in the sublimation characteristics.

In the following, the suitable binders, solvents and additives which can be used for the preparation of the foregoing printing ink will be explained.

As binders, natural resins, semi-synthetic resins and synthetic resins may be used. For example, cellulose derivatives (nitrocellulose, acetylcellulose, hydroxyethylcellulose, ethylcellulose, etc.), rosin and its derivatives (esterified rosin, lime rosin, etc.), alkyd resins (oil free alkyd resin, linseed modified alkyd resin, etc.), acrylic resins (polyacrylic acid, polyacrylamide, polyacrylate, polymethacrylate, etc.), polyvinyl resins (polyvinyl chloride, polyvinyl alcohol, polyvinyl acetal, etc.) are used. Furthermore, polystyrene, polyisobuthylene, polyesters, and rubber and its derivatives (chlorinated rubber, cyclo-rubber, etc.) can be also used.

As the above-mentioned solvents, water and substantially most of the organic solvents can be used, where said solvents must be able to dissolve or disperse said dyestuffs and binders as employed, and boil at a temperature of lower than 220° C., preferably than 150° C., under the atmospheric pressure. The examples of such organic solvents are aliphatic and aromatic hydrocarbons such as n-heptane, benzene, xylene and toluene, halogenated hydrocarbons such as methylene chloride, trichloroethylene and chlorobenzene, nitrated aliphatic hydrocarbon such as nitropropane, aliphatic amide such as dimethylformamide or its mixture, glycols such as ethylene glycol, polyethylene glycol monoethyl ether and polyethylene glycol diethyl ether, diethyl carbonate, dimethyl carbonate, esters such as ethyl acetate, propyl acetate, butyl acetate and β-ethoxyethyl acetate, aliphatic ketones or alicyclic ketones such as methyl ethyl ketone, methyl isobutyl ketone, cyclohexanone, isophorone, mesityl oxide and diacetone alcohol, mixture of aliphatic ketone such as methyl ethyl ketone, mixture of aromatic hydrocarbons such as toluene, and alcohols such as methanol, ethanol, preferably, n-propanol, n-butanol, sec-butanol, tert-butanol and benzyl alcohol. Further, a mixture of several solvents containing at least one of the above solvents can also be used. In the above-mentioned solvents, the most preferable solvents are esters, ketones and alcohols, for example, butyl acetate, acetone, methyl ethyl ketone, ethanol, isopropanol and butanol may be used.

The examples of the additives will be referred in the following. When the sublimation transfer dyeing method of the present invention is carried out by using water ink, several surface active agents such as sodium alkylnaphthalene sulfonate, sodium alkylbenzene sulfonate, sodium tetrahydronaphthalene sulfonate, sodium β-naphthalene sulfonate-formaldehyde condensation product, lignin sulfonic acid derivative, cresol-formaldehyde condensation product, dialkyl sulfosuccinate, alkyl sulfate, quaternary ammonium salt, polyoxyethylene alkyl ether, polyoxyethylene alkyl aryl ether, diethanol amine and morpholine can be used. Further, as the auxiliary additives, sodium polyacrylate, sodium alginate, gum arabic, polyvinyl alcohol, polyethylene glycol, polyethylene polyamine, carboxymethyl cellulose, ethyloxy cellulose and starch can be used. Furthermore, when oil ink is prepared, several surface active agents such as sodium petroleum sulfonate, metallic soap, naphthenate, alkyl sulfate, fatty acid amide, fatty acid amine and its salts, sulfonated naphthalene alkyl ether, diethylaminoethyl stearylamide hydroacetate, 3,9-diethyl-6-tridecanol sulfuric acid ester, quaternary ammonium salt, fatty acid partial ester of polyhydric alcohol, polyoxyethylene alkyl ether and polyoxyethylene alkylaryl ether can be used.

The printing ink is prepared by using these dyestuff, binder, and solvent, and if necessary said additive is further mixed, and the prepared ink is printed on transfer base sheets by proper means such as photogravure printing or offset printing. As the base sheet, the material which has no affinity with the dyestuff may be used, and non-woven material is preferable. As such material, those made of cellulose, particularly conventional paper is suitable. However, regenerated cellulose sheet and metallic plate can also be used according to the case.

As the material to be dyed by means of the method of the present invention, there are textile fabrics, knitted fabrics, artificial leathers, coating films, sheets and molded products of hydrophobic synthetic polymers of polyester, polyurethane, polyamide, acetate, polyacryl and polyvinyl chloride. Further, other materials which are impregnated with or coated with the above-mentioned synthetic polymers may also be used. For example, woolen or cotton fabrics mixed with the above synthetic polymers, or paper sheets metallic plates or wooden plates coated with the above synthetic polymers can be used. Furthermore, such sheet like fabrics or non-woven fabrics made of the above hydrophobic synthetic polymers can be used that contain transitional metals, especially Co, Cr, Cu, Fe, Ag, Mn, Mo, Ni, Ti, V, W, Zn, Zr and Au which forming complexes with the dyestuffs as used in the method of the present invention. Still further, the materials which contain the inorganic salts or organic salts of the above transitional metals may be used. Still further, aluminum treated with anodic oxidation may also be used.

Still more, in some case, paper-made, wooden materials and the like which are not coated with the above-mentioned hydrophobic synthetic polymer can be used.

The following examples show various aspects of the invention in greater detail. It should be understood, however, that these are only illustrative, and other combinations of and variations from the embodiments shown will no doubt occur to those skilled in the art. These are considered to be part of the invention.

EXAMPLE 1

| | Parts |
|---|---|
| Aqueous solution of acrylic resin, solid content: 35% | 17 |
| Water | 48 |
| Isopropyl alcohol | 25 |
| The following dyestuff (VI) | 5 |

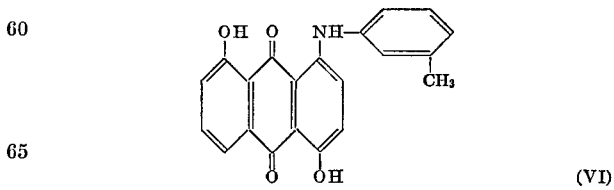

(VI)

Photogravure ink was prepared by uniformly dispersing the above components with using a high speed mixer, and transfer sheet was formed by using this ink through the gravure printing. This transfer sheet was then placed on a textile fabric of polyethylene terephthalate, and contacted tightly with each other by heating at 190° C. for 50 seconds, thereby a dyed material having an excellent bright reddish blue design could be obtained. The lightfastness of this dyed material was good.

EXAMPLE 2

| | Parts |
|---|---|
| Ethyl cellulose (trademark: N-7, made by Hercules Powder Co.) | 8 |
| Ethyl alcohol | 52 |
| Isopropyl alcohol | 31.2 |
| Surface active agent | 0.8 |
| The following dyestuff (VII) | 8 |

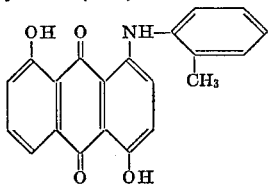

(VII)

Photogravure ink was prepared by kneading the above components with a ball mill. A blue pattern was printed on high quality paper with this ink through photogravure printing to obtain a transfer sheet. This transfer sheet is then placed on a acetate fabric, and pressed by a heating iron at 180° C. for 1 minute. Thereby, a reddish blue pattern was formed on said fabric which was excellent in the lightfastness.

EXAMPLE 3

| | Parts |
|---|---|
| Aqueous solution of acrylic resin, solid content: 30% | 20 |
| Water | 42 |
| Ethyl alcohol | 30 |
| The following dyestuff (VIII) | 5 |

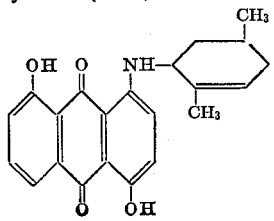

(VIII)

The above components were mixed uniformly by a ball mill to prepare flexographic ink, and a transfer sheet was formed by printing a pattern with this ink on high quality paper through the flexographic printing. This transfer sheet was placed on acetate fabric and heated at 160° C. for 2 minutes under a pressure of 10 mm. Hg. Thereby, a fabric having an excellent blue pattern could be obtained, while the lightfastness of the pattern was good.

EXAMPLES 4–7

Dyeings were carried out under the conditions of dyestuffs, materials to be dyed and operations as shown in the following Table 1, in which the transfer sheets were prepared in like manner as the foregoing Example 1.

TABLE 1

| Example number | Dyestuff | Material to be dyed | Dyeing conditions | Colour |
|---|---|---|---|---|
| 4 | (anthraquinone with O, NH-phenyl-CH₃, HO, O, OH) | Polyester fabric. | 190° C., 40 seconds. | Reddish blue. |
| 5 | (HO, O, NH-phenyl-C₂H₅, O, OH) | Polyamide sheet. | 180° C., 1 minute. | Do. |
| 6 | (HO, O, NH-phenyl with F and CH₃, O, OH) | Polyurethane artificial leather. | 10 mm. Hg., 170° C., 2 minutes. | Do. |
| 7 | (HO, O, NH-phenyl with OCH₃ and CH₃, O, OH) | Coating film of polyester. | 180° C., 1 minute. | Blue. |

EXAMPLE 8

| | Parts |
|---|---|
| Cyclorubber (Alpex-CK-514J, made by Farbwerke Hoechst A.G.) | 15 |
| Xylene | 15 |
| BaSO₄ | 70 |

The above components were ground by a three-roll mill to obtain a mixture, which will be referred to as "Medium A" hereinafter. Then the Medium A having the above-mentioned components was mixed with the following components by a ball mill for 24 hours to obtain silk-screen ink.

| | Parts |
|---|---|
| Medium A | 80 |
| Xylene | 7 |
| Fine powder of silica | 3 |
| Dyestuff (VII) | 10 |

By using thus prepared ink, a transfer sheet was formed in like manner as Example 2, and similar fabric was obtained.

EXAMPLE 9

By using the above-mentioned Medium A, the following components were ground by a ball mill to obtain photogravure ink.

```
                                        Parts
Medium A _____  37
Xylene _____  50
Fine powder of silica _____   3
Dyestuff (VI) _____  10
```

By using thus prepared ink, a transfer sheet was formed in like manner as Example 1, and similar dyed fabric was obtained.

EXAMPLE 10

```
                                        Parts
Linseed oil modified alkyd resin (oil length: 65,
  phthalic anhydride + trimethylol propane) _____ 72
Cobalt naphthenate (cobalt content: 5%) _____   1
Magie Oil No. 470 (hydrocarbon solvent, made by
  Magie Oil Brothers Co.) _____   5
Dyestuff (VII) _____  22
```

By using the above components, offset ink was prepared in like manner as Example 2, and further similar fabric was obtained through the similar method.

By the above disclosure and examples, the characteristic feature of the present invention may be fully understood. It should be emphasized, however, that the specific examples described herein are intended as merely illustrative and in no way restrictive of the invention.

What is claimed is:

1. In a sublimation transfer dyeing method the improvement comprising the step of subliming from a transfer member onto a receiving stratum dyes comprising compounds of the general formula:

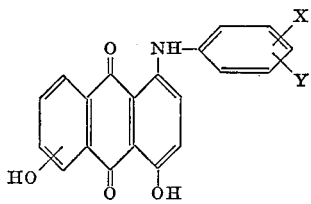

in which X represents a methyl group or ethyl group at ortho or meta position with regard to the imino group, and Y represents a hydrogen atom, methyl group, methoxy group, fluorine atom or chlorine.

2. A sublimation transfer dyeing method as claimed in claim 1, in which said X is a methyl group and Y is a hydrogen atom.

3. In a sublimation transfer dyeing method the improvement comprising the step of subliming from a transfer member onto a receiving stratum the compounds of the general formula:

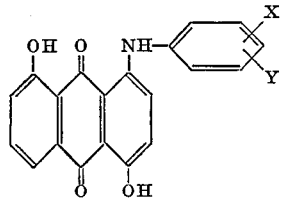

in which X represents a methyl group or ethyl group at ortho or meta position with regard to the imino group, and Y represents a hydrogen atom, methyl group, methoxy group, fluorine atom or chlorine atom.

4. A sublimation transfer dyeing method as claimed in claim 3, in which X is a methyl group and Y is a hydrogen atom.

5. A sublimation transfer dyeing method as claimed in claim 4, in which said methyl group is positioned at the ortho position with regard to the imino group of said compound.

6. A sublimation transfer dyeing method as claimed in claim 1 wherein woven fabric material or sheet made of hydrophobic synthetic polymer is dyed.

7. A sublimation transfer dyeing method as claimed in claim 1 wherein a moulded article made of hydrophobic synthetic polymer is dyed.

8. A sublimation transfer dyeing method as claimed in claim 1 wherein a paper-made, wooden or metallic article coated by hydrophobic synthetic polymer is dyed.

9. A sublimation transfer dyeing method as claimed in claim 1 wherein an anodic-oxidized aluminum article is dyed.

10. A sublimation transfer dyeing method as claimed in claim 1 wherein a fabric or sheet of hydrophobic synthetic polymer containing a transitional metal is dyed.

11. A sublimation transfer dyeing method as claimed in claim 1, wherein said dyeing is carried out in vacuo.

12. A method of dyeing employing a sublimation transfer technique with heat comprising the steps of:
  (a) applying dye containing ink to a transfer base substrate said ink including compounds of the general formula:

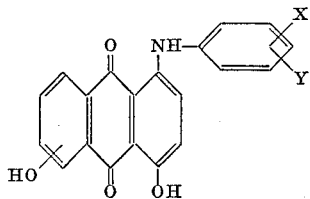

wherein X represents a methyl group or ethyl group at the ortho or meta position with regard to the imino group, and Y represents a hydrogen atom, methyl group, methoxy group, fluorine atom or chlorine atom;
  (b) contacting the ink coated substrate to an article to be dyed; and
  (c) applying heat to the substrate and subliming said dye to effect transfer of said dye to the article being dyed, said dyed article being substantially uniformly dyed.

13. The process according to claim 12 wherein said ink is applied to the substrate by photo-gravure printing or offset printing.

14. The method according to claim 12 wherein said ink includes a compatible binder, solvent, and additive, said dyestuff compound being present in a minor amount.

References Cited

UNITED STATES PATENTS 3,649,332  3/1972  Dybrig _____ 8—2.5 UX

FOREIGN PATENTS 1,136,932  12/1968  France _____ 8—39

OTHER REFERENCES

AATCC Technical Manual, Method 117, 1967, p. 122, pub. by Amer. Assoc. Tex. Chem. & Col., 1972.

DONALD LEVY, Primary Examiner

U.S. Cl. X.R.
8—39; 260—380

UNITED STATES PATENT OFFICE
CERTIFICATE OF CORRECTION

Patent No. 3,829,286  Dated August 13, 1974

Inventor(s) Masao ANZAI and Masayuki MIYATAKE

It is certified that error appears in the above-identified patent and that said Letters Patent are hereby corrected as shown below:

Column 1, line 59, "is" should be --are--;

Column 1, line 59, "are" should be --is--;

Column 2, last line, "methy" should be --methyl--;

Column 4, third formula, "HH$_2$" should read --NH$_2$--;

Column 9, claim 1, last line --atom-- should be inserted after "chlorine"

Signed and sealed this 29th day of October 1974.

(SEAL)
Attest:

McCOY M. GIBSON JR.
Attesting Officer

C. MARSHALL DANN
Commissioner of Patents